Aug. 16, 1938.　　O. A. SCHIERNBECK　　2,126,927
GRAPHING APPLIANCE
Filed March 26, 1938　　3 Sheets-Sheet 1
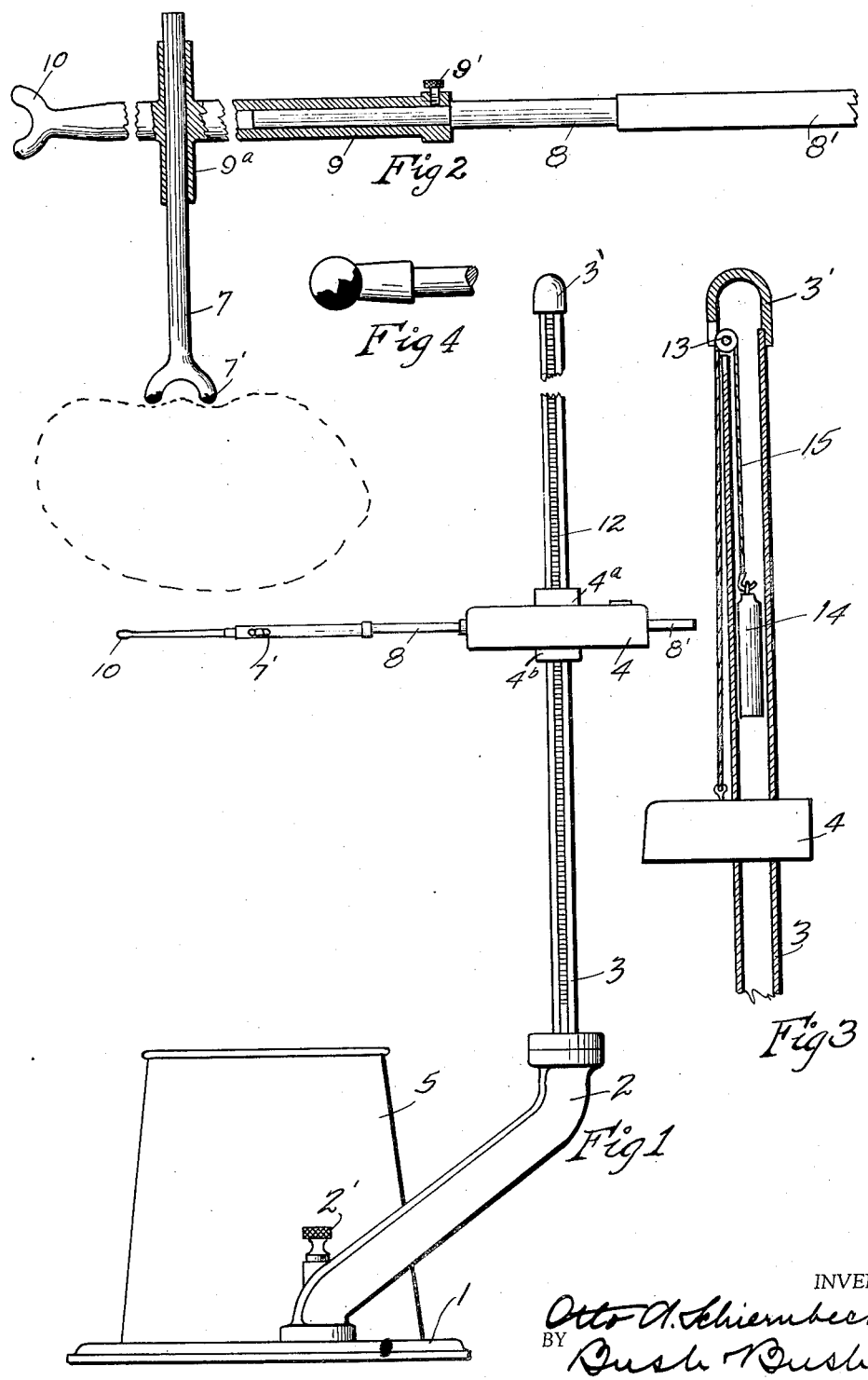
INVENTOR.
Otto A. Schiernbeck,
BY Bush & Bush,
ATTORNEYS.

Aug. 16, 1938.   O. A. SCHIERNBECK   2,126,927
GRAPHING APPLIANCE
Filed March 26, 1938   3 Sheets-Sheet 2
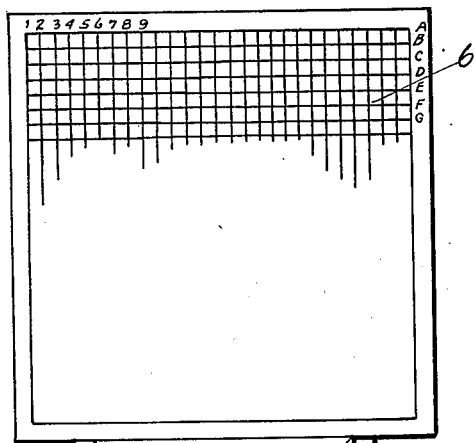
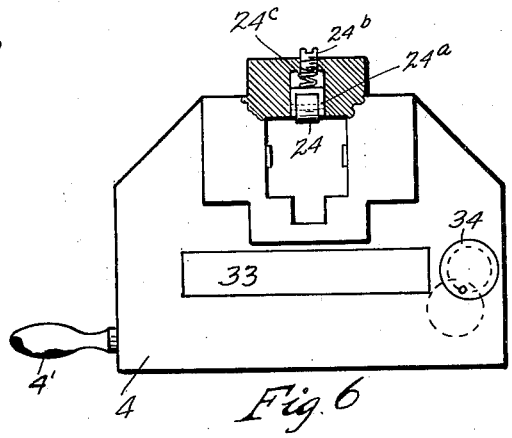
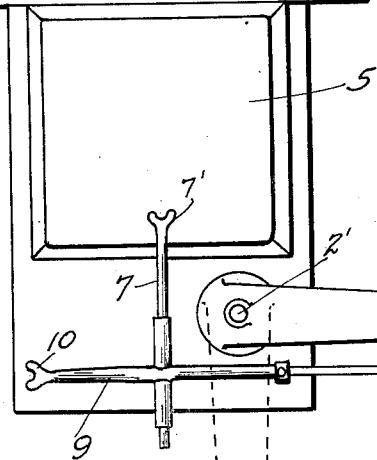
Fig. 5
Fig. 6
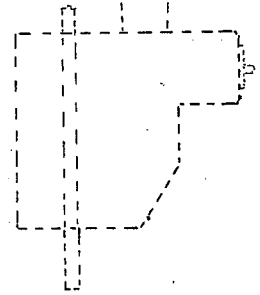
INVENTOR.
Otto A. Schiernbeck,
BY Bush & Bush,
ATTORNEYS.

INVENTOR.
Otto A. Schiernbeck,
BY Bush & Bush
ATTORNEYS.

Patented Aug. 16, 1938

2,126,927

UNITED STATES PATENT OFFICE 2,126,927

GRAPHING APPLIANCE

Otto A. Schiernbeck, Davenport, Iowa

Application March 26, 1938, Serial No. 198,267

10 Claims. (Cl. 33—23)

My invention relates to appliances for making records or graphs of the lateral and the anterior-posterior curvatures of the spines of human beings.

The objects of my invention are:

To provide apparatus which can be applied to the back of a patient at a given point and mechanically or manually drawn along the patient's spine while guided manually to maintain its position either laterally or anteriorly-posteriorly relative to the spine and which will record or make a graph of either the lateral or the forward and back movements of the contactors corresponding to the curves of the spinal column; to provide means by which comparative graphs of the lateral and the anterior-posterior curves of the spinal column corresponding as to rate of travel and point of beginning and ending may be made; to provide means for automatically recording the movements of a contact point or points drawn along the spine of a human being; to provide means for automatically making a graph indicating the contour or lateral curves of a surface or line to which it may be applied.

I attain these objects by the means illustrated in the accompanying drawings, in which,—

Figure 1 is an elevation of my machine;

Figure 2 is a plan view of the rods which carry the contacting members or elements;

Figure 3 is an enlarged section detail of the tubular column on the middle line thereof, but showing also an outline of the housing;

Figure 4 is a detail of an alternate form of contactor;

Figure 5 is a plan view of my apparatus showing in dotted lines the alternative position of the housing and supporting column;

Figure 6 is an enlarged detail of an alternate form of housing designed to be manually movable upon the supporting column instead of being motor-driven thereon;

Figure 8:
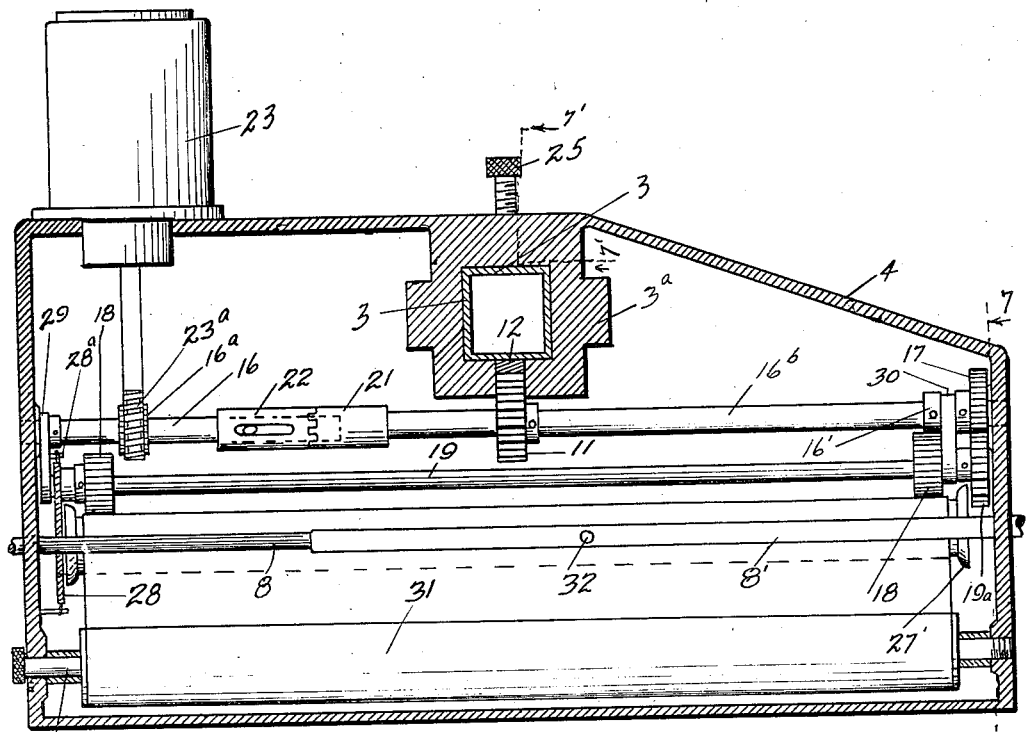
Figure 7:
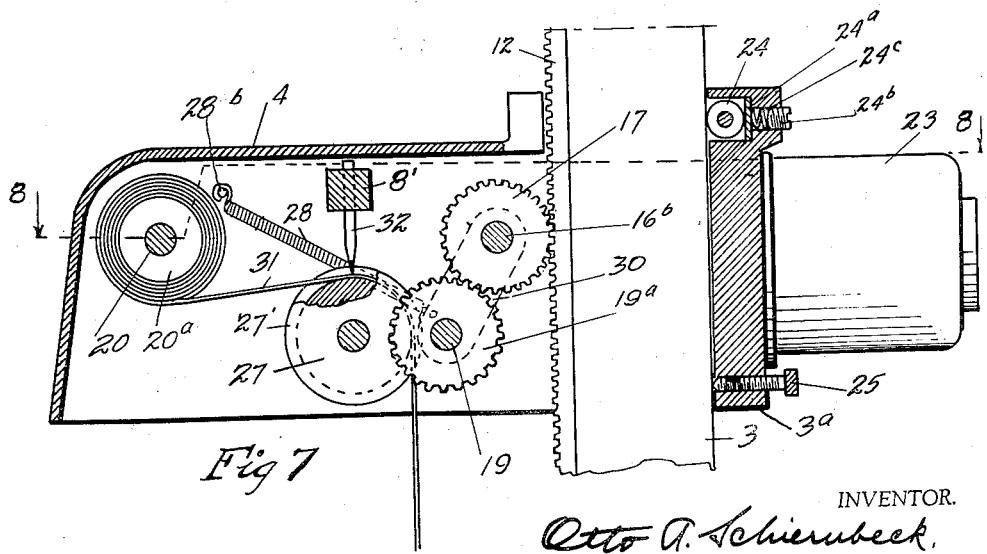

Figure 7 is an enlarged detail of the motor-driven housing in section on the line 7—7 of Figure 8, but showing part of the bearing block 3a in section on the line 7'—7' of Figure 8; and showing the paper feed-roll, paper cylinder and driving gears;

Figure 8 is an enlarged section detail on the line 7—7 of Figure 7.

Similar numerals refer to similar parts throughout the several views.

My apparatus in its preferred form comprises a base 1 of sufficient weight to hold the apparatus in upright position. Upon this base an arm 2 is swiveled or pivotally mounted, which may be swung into the two positions illustrated in Figure 4. A set screw 2' may be secured in the lower part of the arm by which it may be locked in the desired position upon the base 1.

Upon the upper end of the arm 2 I mount a column 3 which is preferably tubular and may be either square or round or other desired shape. To one side of the column 3 I unite a rack-bar 12 extending longitudinally of the column. The housing 4 is slidably mounted upon the column 3 by a bearing block 3a which may be provided with hubs 4a and 4b united to it and through which the column 3 extends and which give the housing a longer bearing upon the column.

The hubs 4a and 4b may be provided with one or more rolls 24 to reduce friction as the housing travels up and down on the column 3.

Slidable within the housing 4 I mount a horizontal rod 8 one end of which 8' is squared so as to prevent rotation thereof and passes through a squared opening in one end of the housing. The opposite end of the rod 8 is preferably round in section and has adjustably mounted thereon a sleeve 9 the opposite end of which is formed into a contact element 10 preferably forked, which can be applied to the back of a patient as hereinafter described. The sleeve 9 may be secured in position upon the rod 8 by a set screw 9' or other suitable means.

The sleeve 9 has a transverse sleeve 9a united to or formed integral therewith in which a transverse rod 7 is slidably mounted. The rod 7 has a similar contact element 7' formed upon one end thereof.

A stylus 32 is mounted in or upon the rod 8', the point of which is adapted to bear upon and make a record upon a blank sheet of paper 31 which passes from a feed-roll 20a over a cylinder 27 and out through the bottom of the housing 4.

The feed-roll 20a may be revolvably mounted upon an axle 20 the ends of which are secured in opposite sides or ends of the housing 4.

In order to drive the paper 31 I mount upon the housing 4 a reversible motor 23 the shaft of which is provided with a worm 23a which meshes with a worm gear 16a carried by the shaft 16. A sliding clutch member 22 is mounted upon the shaft 16 and engages a fixed clutch member 21 secured upon the shaft 16b. One end of the shaft 16 extends into the fixed clutch member 21 and forms a support for the adjacent end of the shaft 16b.

A drive gear 17 is mounted upon one end of the shaft 16b and meshes with a driven gear 19a upon the shaft 19, the ends of which are in suitable bearings in the links 29 and 30.

Knurled rolls 18 are mounted upon the shaft 19 and bear against the paper 31 as it passes over the cylinder 27, thus driving the paper. Flanges 27' may be formed upon the ends of the cylinder 27 to prevent lateral displacement of the paper 31.

The shafts 16 and 16b may be formed separately and connected by the clutch as shown in Figure 8, but if desired, the clutch may be omitted and the shaft 16 and 16b formed integral.

Links 29 and 30 are mounted upon and near the ends of the shaft 19 and act as spacers to maintain the knurled rolls 18 in contact with the paper 31 upon the cylinder 27, and a tension spring 28 has one end united to a pin 28b secured in the housing 4, and the other end united to a pin 28a united to the link 29 to exert constant pressure on the rolls 18 against the paper 31 and cylinder 27.

A set screw 25 may be threaded into the bearing block 3a to lock the housing in a given position, while either the patient or the apparatus is being moved or reset.

The shaft 16b carries a spur gear 11 which has cogs cut therein adapted to mesh with the rack-bar 12.

In Figure 6 I have shown a housing to be operated manually along the column 3 by a handle 4', but I prefer the motor-operated form of housing as being more reliable and uniform in its operation.

A seat or bench 5 is mounted upon the base and a plate 6 of rubber, glass, wire, or other suitable material, is secured to the base for a foot rest. The plate 6 is preferably provided with crossed lines numbered in one direction and lettered in the other direction so that the exact position of the feet may be recorded for future reference.

In the operation of my apparatus, the patient is preferably seated upon the bench 5 with his feet in the desired position upon the plate 6. The housing is then placed at the bottom or top of its permissible travel. The contactor 7' is then placed in contact with the patient's back astride his spinal column, or in close contact therewith. The motor is then started in the proper direction, the clutch thrown into engagement and the operator will manually guide the contactor 7' to keep it centered in the desired position relative to the median line of the spine as the housing travels along the column 3. The lateral movement of the rod 7 will cause the sleeves 9a and 9 to move with it, and the rod 8—8' will thus be caused to slide in the housing to correspond with the movements of the sleeve 9, thereby causing the stylus 32 to mark a line upon the paper 31, which line will correspond with the lateral curvature of the spine of the patient.

When a lateral record has thus been made and it is desired to make a graph of the anterior-posterior contour, the supporting arm will be turned into the position shown in dotted lines in Figure 5 and the contact element 10 will be placed in contact with the patient's back astride his spine. The housing will be adjusted at its initial starting point and the motor started as before. The contactor 10 will then be manually held by the operator in contact with the patient's back and the forward and back curves of his spinal region will be recorded by the stylus 32 as before.

When desired, resilient means may be utilized to hold the fork 10 in contact with the surface of the patient's back as by a tension spring 4c attached to the outer end of the rod 8', and to the housing 4, but when so used, it will be necessary, or at least advisable, for the operator to guide the contact element sufficiently to prevent any accidental lateral displacement thereof.

In order that the operation of the stylus may be observable, I provide an opening in the top of the housing 4 and insert therein a glass 33, and to enable the stylus to be changed, I provide a circular opening in the top of the housing with a cover plate 34 pivoted at one side, through which opening the stylus may be removed or inserted.

In the manually operable form shown in Figure 6, the same motor-driven paper blank may be used or any of the well-known means in common use for driving a record blank by springs or otherwise, may be substituted.

Different forms of contactors and various modifications of the apparatus shown may be made without departing from the spirit of my invention and I do not limit my claims to the precise forms shown in the drawings.

I claim:

1. In a graphing apparatus, a base, a supporting arm mounted thereon, a vertical column mounted upon the arm, a housing mounted on the column for travel longitudinally thereof, a horizontal rod extending through and slidable lengthwise in the housing and having a contactor at one end thereof, a movable paper blank mounted for travel within the housing, a stylus united to the rod bearing upon the blank, and motor-driven means to cause the housing to travel at uniform speed along the column.

2. In a graphing apparatus, a base, a supporting arm mounted thereon, a vertical column mounted upon the arm, a housing mounted on the column for travel longitudinally thereof, a horizontal rod extending through and slidable lengthwise in the housing and having a contactor at one end thereof, a movable paper blank mounted for travel within the housing, a stylus united to the rod bearing upon the blank, and motor-driven means to cause the housing to travel at uniform speed along the column and to simultaneously drive the paper blank at uniform speed.

3. In a graphing apparatus, a base, a supporting arm mounted thereon, a vertical column mounted upon the arm, a housing mounted on the column for travel longitudinally thereof, a horizontal rod extending through and slidable lengthwise in the housing and having a contactor at one end thereof for manual guidance along the back of a person under examination, adjacent the spine, a movable paper blank mounted for travel within the housing, a stylus united to the rod bearing upon the blank, and motor-driven means to cause the housing to travel at a uniform speed along the column.

4. In a graphing apparatus, a base, a supporting arm mounted thereon, a vertical column mounted upon the arm, a housing mounted on the column for travel longitudinally thereof, a horizontal rod extending through and slidable lengthwise in the housing and having a contactor at one end thereof for manual guidance along the back of a person under examination adjacent the spine, a movable paper blank mounted for travel within the housing, a stylus united to the rod bearing upon the blank, and motor-driven means to cause the housing to travel at uniform speed along the column and to simultaneously drive the paper blank at a uniform speed.

5. In a surface contour recording apparatus, a base, a supporting arm swiveled thereon, a vertical column mounted upon the arm, a housing mounted on the column for travel longitudinally thereof, a horizontal rod extending through and slidable lengthwise in the housing, a transverse rod slidably mounted upon the horizontal rod and having a contactor formed at one end thereof for manual application to the back of a patient adjacent his spine, a movable blank mounted for travel within the housing, and a stylus united to the horizontal rod bearing upon the blank, and means to cause the housing to travel at uniform speed along the column.

6. In a surface contour recording apparatus, a base, a supporting arm swiveled thereon, a vertical column mounted upon the arm, a housing mounted on the column for travel longitudinally thereof, a horizontal rod extending through and slidable lengthwise in the housing, a transverse rod slidably mounted upon the horizontal rod and having a contactor formed at one end thereof for manual application to the back of a patient adjacent his spine, a movable blank mounted for travel within the housing, and a stylus united to the horizontal rod bearing upon the blank, and means to cause the housing to travel at uniform speed along the column and to simultaneously drive the paper blank at uniform speed.

7. An apparatus for graphing contours and lateral curves, a base, a supporting arm swiveled thereon, a vertical column mounted upon the arm, a housing mounted on the column for travel longitudinally thereof, a horizontal rod extending through and slidable lengthwise in the housing and having a forked contactor at one end thereof for manual application to the back of a patient astride his spine, a transverse rod slidably mounted upon the horizontal rod for transverse movement thereon, a forked contactor at one end thereof for manual application to the back of a patient along his spine, a stylus united to the horizontal rod bearing upon a movable paper blank mounted for travel within the housing, and means to cause the housing to travel at uniform speed along the column.

8. An apparatus for graphing contours and lateral curves, a base, a supporting arm swiveled thereon, a vertical column mounted upon the arm, a rack-bar united to the column extending lengthwise thereof, a housing mounted on the column for travel longitudinally thereof, a drive shaft mounted in the housing carrying a spur-gear meshing with the rack-bar, a horizontal rod extending through and slidable lengthwise in the housing and having a forked contactor at one end thereof for manual application to the back of a patient astride his spine, a stylus united to the horizontal rod bearing upon a movable paper blank mounted for travel within the housing, a motor mounted upon the housing and gearing operatively connecting the motor shaft to the drive shaft.

9. An apparatus for graphing contours and lateral curves, a base, a supporting arm swiveled thereon, a vertical column mounted upon the arm, a rack-bar united to the column extending lengthwise thereof, a housing mounted on the column for travel longitudinally thereof, a drive shaft mounted in the housing carrying a spur-gear meshing with the rack-bar, a horizontal rod extending through and slidable lengthwise in the housing and having a forked contactor at one end thereof for manual application to the back of a patient astride his spine, a transverse rod slidably mounted upon the horizontal rod for transverse movement thereon, a forked contactor at one end thereof for manual application to the back of a patient astride his spine, a stylus united to the horizontal rod bearing upon a movable paper blank mounted for travel within the housing, a motor mounted upon the housing and gearing operatively connecting the motor shaft to the drive shaft, and means operated by the motor to drive the paper blank at uniform speed.

10. An appliance as described in claim 1, in combination with resilient means attached to the rod and the housing to exert constant tension upon the rod in one direction.

OTTO A. SCHIERNBECK.